US008086332B2

(12) United States Patent
Dorogusker et al.

(10) Patent No.: US 8,086,332 B2
(45) Date of Patent: Dec. 27, 2011

(54) MEDIA DELIVERY SYSTEM WITH IMPROVED INTERACTION

(75) Inventors: Jesse L. Dorogusker, Menlo Park, CA (US); Donald J. Novotney, San Jose, CA (US); Scott Krueger, Mountain View, CA (US); Jeff Hammerstrom, San Carlos, CA (US); Greg Marriott, Honolulu, HI (US); Greg Lydon, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 1325 days.

(21) Appl. No.: 11/364,615

(22) Filed: Feb. 27, 2006

(65) Prior Publication Data

US 2007/0201705 A1 Aug. 30, 2007

(51) Int. Cl.
*G06F 17/00* (2006.01)

(52) U.S. Cl. ........................................ 700/94; 715/716

(58) Field of Classification Search .......... 381/104–109; 700/94

See application file for complete search history.

(56) References Cited

U.S. PATENT DOCUMENTS

| | | | |
|---|---|---|---|
| 4,673,861 | A | 6/1987 | Dubovsky et al. |
| 4,847,781 | A | 7/1989 | Brown, III et al. |
| 5,150,031 | A | 9/1992 | James et al. |
| 5,186,646 | A | 2/1993 | Pederson |
| 5,680,102 | A | 10/1997 | Xydis |
| 5,694,137 | A | 12/1997 | Wood |
| 5,712,638 | A | 1/1998 | Issa |
| 5,754,027 | A | 5/1998 | Oglesbee et al. |
| 5,964,847 | A | 10/1999 | Booth et al. |
| 6,012,105 | A | 1/2000 | Rubbmark et al. |
| 6,031,797 | A | 2/2000 | Van Ryzin et al. |
| 6,038,457 | A | 3/2000 | Barkart |
| 6,125,455 | A | 9/2000 | Yeo |
| 6,130,518 | A | 10/2000 | Gabehart et al. |
| 6,178,514 | B1 | 1/2001 | Wood |
| 6,204,637 | B1 | 3/2001 | Rengan |
| 6,211,581 | B1 | 4/2001 | Farrant |
| 6,252,380 | B1 | 6/2001 | Koenck |
| 6,283,789 | B1 | 9/2001 | Tsai |
| 6,304,764 | B1 | 10/2001 | Pan |
| 6,314,479 | B1 | 11/2001 | Frederick et al. |
| 6,591,085 | B1 | 7/2003 | Grady |
| 6,608,264 | B1 | 8/2003 | Fouladpour |

(Continued)

FOREIGN PATENT DOCUMENTS

| | | |
|---|---|---|
| EP | 1 104 150 | 5/2001 |

(Continued)

OTHER PUBLICATIONS

U.S. Appl. No. 11/245,937, filed Oct. 7, 2005, entitled Techniques for Pairing Remote Controllers With Host Devices.

(Continued)

*Primary Examiner* — Walter F Briney, III

(74) *Attorney, Agent, or Firm* — Kilpatrick Townsend & Stockton LLP

(57) ABSTRACT

Methods and systems for improved interaction between media devices and accessory devices are disclosed. In one embodiment, the improved interaction can operate to configure a user interface of a media device dependent on the type or condition of an accessory device. In the same or another embodiment, the improved interaction can exchange status information between a media device and an accessory device that can influence operation of either or both of the devices.

22 Claims, 12 Drawing Sheets

U.S. PATENT DOCUMENTS

| | | | | |
|---|---|---|---|---|
| 6,614,232 | B1 | 9/2003 | Mukai | |
| 6,653,813 | B2 | 11/2003 | Khatri | |
| 6,725,061 | B1 | 4/2004 | Hutchison, IV et al. | |
| 6,859,538 | B1 * | 2/2005 | Voltz | 381/77 |
| 6,879,348 | B1 | 4/2005 | Niida | |
| 6,914,551 | B2 | 7/2005 | Vidal | |
| 6,931,456 | B2 | 8/2005 | Payne et al. | |
| 7,050,783 | B2 | 5/2006 | Curtiss et al. | |
| 7,062,261 | B2 | 6/2006 | Goldstein et al. | |
| 7,127,678 | B2 | 10/2006 | Bhesania et al. | |
| 7,283,635 | B1 * | 10/2007 | Anderson et al. | 381/74 |
| 7,574,177 | B2 | 8/2009 | Tupman | |
| 7,647,129 | B1 * | 1/2010 | Griffin, Jr. | 700/94 |
| 2001/0005641 | A1 | 6/2001 | Matsumoto et al. | |
| 2001/0006884 | A1 | 7/2001 | Matsumoto | |
| 2001/0033244 | A1 | 10/2001 | Harris et al. | |
| 2002/0002035 | A1 | 1/2002 | Sim et al. | |
| 2002/0010759 | A1 | 1/2002 | Hitson et al. | |
| 2002/0029303 | A1 | 3/2002 | Nguyen | |
| 2002/0065074 | A1 | 5/2002 | Cohn et al. | |
| 2002/0090982 | A1 | 7/2002 | Hollstrom et al. | |
| 2002/0103008 | A1 | 8/2002 | Rahn et al. | |
| 2002/0105861 | A1 | 8/2002 | Leapman | |
| 2002/0115480 | A1 | 8/2002 | Huang | |
| 2002/0132651 | A1 | 9/2002 | Jinnouchi | |
| 2002/0145536 | A1 | 10/2002 | Clise | |
| 2002/0151327 | A1 | 10/2002 | Levitt | |
| 2003/0041206 | A1 | 2/2003 | Dickie | |
| 2003/0073432 | A1 | 4/2003 | Meade | |
| 2003/0079038 | A1 | 4/2003 | Robbin et al. | |
| 2003/0097379 | A1 | 5/2003 | Ireton | |
| 2003/0162562 | A1 | 8/2003 | Curtiss et al. | |
| 2003/0172209 | A1 | 9/2003 | Liu et al. | |
| 2003/0220988 | A1 | 11/2003 | Hymel | |
| 2003/0236075 | A1 | 12/2003 | Johnson et al. | |
| 2004/0090998 | A1 | 5/2004 | Chen | |
| 2004/0103223 | A1 | 5/2004 | Gabehart et al. | |
| 2004/0162029 | A1 * | 8/2004 | Grady | 455/42 |
| 2004/0186935 | A1 | 9/2004 | Bel et al. | |
| 2004/0194154 | A1 | 9/2004 | Meadors et al. | |
| 2004/0224638 | A1 | 11/2004 | Fadell et al. | |
| 2004/0249994 | A1 | 12/2004 | Shapiro et al. | |
| 2005/0014531 | A1 | 1/2005 | Findikli | |
| 2005/0014536 | A1 | 1/2005 | Grady | |
| 2005/0017946 | A1 | 1/2005 | Park | |
| 2005/0088275 | A1 | 4/2005 | Valoteau et al. | |
| 2005/0111675 | A1 * | 5/2005 | Lee | 381/104 |
| 2005/0207726 | A1 | 9/2005 | Chen | |
| 2006/0035527 | A1 | 2/2006 | Numano | |
| 2006/0109987 | A1 | 5/2006 | Baek | |
| 2006/0156415 | A1 | 7/2006 | Rubinstein et al. | |
| 2006/0184456 | A1 | 8/2006 | de Janasz | |
| 2007/0015457 | A1 | 1/2007 | Krampf et al. | |
| 2007/0056013 | A1 | 3/2007 | Duncan | |
| 2007/0080823 | A1 | 4/2007 | Fu et al. | |
| 2008/0243282 | A1 * | 10/2008 | Koski et al. | 700/94 |

FOREIGN PATENT DOCUMENTS

| | | | |
|---|---|---|---|
| JP | 2000-287119 | A | 10/2000 |
| JP | 2002-221974 | A | 8/2002 |
| JP | 2002-252566 | | 9/2002 |
| JP | 3090747 | U | 10/2002 |
| JP | 2002-342659 | | 11/2002 |
| JP | 2002-374447 | | 12/2002 |
| JP | 2003-032351 | | 1/2003 |
| JP | 2003-274386 | | 9/2003 |
| JP | 2005-310287 | A | 11/2005 |
| JP | 2005-323135 | A | 11/2005 |
| WO | WO 99/26330 | | 5/1999 |
| WO | WO 00/39907 | | 7/2000 |
| WO | WO 02/49314 | | 6/2002 |
| WO | WO 03/036541 | A1 | 5/2003 |
| WO | WO 2004/098079 | A1 | 11/2004 |

OTHER PUBLICATIONS

U.S. Appl. No. 11/326,169, filed Jan. 4, 2006, entitled Remote Controller and FM Reception Arrangement.

Belkin iPod Voice Recorder, Product Specification Sheet, printed Jun. 16, 2004.

“IpodDock/iPod Cradle,” www.bookendzdocks.com/bookendz/dock_cradle.htm, downloaded Feb. 27, 2003.

“Neuros MP3 Digital Audio Computer,” 2003. www.neurosaudio.com, downloaded Apr. 9, 2003.

European Patent Application No. 10160463.5, European Search Report, 9 pages, Jun. 7, 2010.

“Altec Lansing inMotion,” User's guide, 2003 Altec Lansing Technologies; 8 pages.

“Salling Clicker 2.2.1”, User Manual, Copyright 2003-2005 Salling Software AB, 45 pages.

“Remote for iTunes; Controls ITunes, DVD, CD and more! (URM-15T)”, product information datasheet, Keyspan, http://www.keyspan.com/products/usb/urm15t, downloaded Sep. 25, 2005, 2 pages.

“Express Remote; Remote Control for your Mac or PC (URM-17A)”, product information datasheet, Copyright 2005, Keyspan, http://www.keyspan.com/products/usb/urm17a/, downloaded Sep. 25, 2005, 2 pages.

“Express Remote Supports Apple's Airport Express,” Press Release, Nov. 10, 2004, Copyright 2005,Keyspan, 2 pages.

“Keyspan Express Remote,” Product Fact Sheet, Oct. 2004, 1 page.

“DMR Software v1.3 for Mac Os X—User Manual”, Copyright 2002, Keyspan, rev. 04.09.01A1, 50 pages.

* cited by examiner

MEDIA DELIVERY SYSTEM WITH IMPROVED INTERACTION

CROSS-REFERENCE TO RELATED APPLICATIONS

The application is related to (i) U.S. patent application Ser. No. 11/051,499, filed Feb. 23, 2005, entitled "ACCESSORY AUTHENTICATION FOR ELECTRONIC DEVICES," which is hereby incorporated herein by reference; (ii) U.S. patent application Ser. No. 11/245,937, filed Oct. 7, 2005, entitled "TECHNIQUES FOR PAIRING REMOTE CONTROLLERS WITH HOST DEVICES," which is hereby incorporated herein by reference; (iii) U.S. patent application Ser. No. 10/423,490, filed Apr. 25, 2003, entitled "MEDIA PLAYER SYSTEM," which is hereby incorporated herein by reference; and (iv) U.S. patent application Ser. No. 11/326,169, filed Jan. 4, 2006, entitled "REMOTE CONTROLLER AND FM RECEPTION ARRANGEMENT," which is hereby incorporated herein by reference.

BACKGROUND OF THE INVENTION

1. Field of the Invention

The present invention relates to media devices and, more particularly, to portable media devices, such as portable media players, that receive accessory devices.

2. Description of the Related Art

A media player stores media assets, such as audio tracks or photos, that can be played or displayed on the media player. One example of a media player is the iPod® media player, which is available from Apple Computer, Inc. of Cupertino, Calif. Often, a media player acquires its media assets from a host computer that serves to enable a user to manage media assets. As an example, the host computer can execute a media management application to manage media assets. One example of a media management application is iTunes® produced by Apple Computer, Inc.

A media player typically includes one or more connectors or ports that can be used to interface to the media player. For example, the connector or port can enable the media player to (i) couple to a host computer, (ii) be inserted into a docking system, or (iii) receive an accessory device. There are today many different types of accessory devices that can interconnect to the media player. For example, a remote control can be connected to the connector or port to allow the user to remotely control the media player. As another example, an automobile can include a connector and the media player can be inserted onto the connector such that an automobile media system can interact with the media player, thereby allowing the media content on the media player to be played within the automobile media system. As still another example, a media player can be connected to a speaker dock which can then serve as a portable media system.

Notwithstanding the foregoing, there is a need for improved interaction between media devices and accessory devices.

SUMMARY OF THE INVENTION

The invention pertains to methods and systems for improved interaction between media devices and accessory devices. In one embodiment, the improved interaction can operate to configure a user interface of a media device dependent on the type or condition of an accessory device. The configuration of the user interface can be automatically performed when the media device is connected with the accessory device. In the same or another embodiment, the improved interaction can exchange status (or state) information between a media device and an accessory device that can influence operation of either or both of the devices. The exchange of the status information can be automatically performed while the media device is connected with the accessory device.

The invention can be implemented in numerous ways, including as a method, system, device, apparatus (including graphical user interface), or computer readable medium. Several embodiments of the invention are discussed below.

As a method for operating a portable media device, one embodiment of the invention includes at least the acts of: detecting attachment of an auxiliary device to the portable media device; obtaining auxiliary device information from the auxiliary device after detecting that the auxiliary device is attached to the portable media device; and thereafter configuring the portable media device to operate in accordance with the auxiliary device information.

As a method for operating a portable media device, another embodiment of the invention includes at least the acts of: detecting attachment of an auxiliary speaker system to the portable media device; obtaining volume status information from the auxiliary speaker system after detecting that the auxiliary speaker system is attached to the portable media device; and thereafter configuring a volume setting on the portable media device based on the volume status information.

As a method for operating a portable media device, still another embodiment of the invention includes at least the acts of: obtaining volume status information from an auxiliary speaker system that is operatively connected to the portable media device; receiving a user input that alters the volume status information; processing the user input at the portable media device to produce altered volume status information; and causing the volume status information stored in the auxiliary speaker system to be updated based on the altered volume status information.

As a computer readable medium including at least computer program code for operating a portable media device, one embodiment of the invention includes at least: computer program code for detecting attachment of an auxiliary device to the portable media device; computer program code for obtaining auxiliary device information from the auxiliary device after the computer program code for detecting detects that the auxiliary device is attached to the portable media device; and computer program code for configuring the portable media device to operate in accordance with the auxiliary device information.

As a computer readable medium including at least computer program code for operating a portable media device, another embodiment of the invention includes at least: computer program code for detecting attachment of an auxiliary speaker system to the portable media device; computer program code for obtaining volume status information from the auxiliary speaker system after the computer program code for detecting detects that the auxiliary speaker system is attached to the portable media device; computer program code for configuring a volume setting on the portable media device based on the volume status information; computer program code for receiving a user input that alters the volume status information; computer program code for processing the user input at the portable media device to produce altered volume status information; and computer program code for causing the volume status information stored in the auxiliary speaker system to be updated based on the altered volume status information.

As a portable media delivery system, one embodiment of the invention includes a portable electronic device and a speaker system. The portable electronic device is operatively connectable to the speaker system and includes at least (i) a media storage device that stores media content for one or more media items, and (ii) a media presentation module that retrieves media content for at least one of the media items from the media storage and causes the media content to be presented for a user of the portable electronic device. The speaker system stores at least a device identifier and a system status information. When the speaker system is operatively connected to the portable electronic device, the portable electronic device can receive the device identifier and the system status information from the speaker system, and then configure a user interface associated with the portable electronic device based on at least the system status information.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to methods and systems for improved interaction between media devices and accessory devices. In one embodiment, the improved interaction can operate to configure a user interface of a media device dependent on the type or condition of an accessory device. The configuration of the user interface can be automatically performed when the media device is connected with the accessory device. In the same or another embodiment, the improved interaction can exchange status (or state) information between a media device and an accessory device that can influence operation of either or both of the devices. The exchange of the status information can be automatically performed while the media device is connected with the accessory device.

The improved interaction provided by the invention is well suited for electronic devices, namely, consumer electronic products such as media devices, that can receive accessory devices (or auxiliary devices). One example of a media device is a media player, such as a handheld media player (e.g., music player), that can present (e.g., play) media items (or media assets). Examples of accessory devices, include: voice recorders, FM transceivers, peripheral bus devices (e.g., FireWire® devices or USB devices), media devices (e.g., media readers, displays, cameras, etc.), power units (e.g., power adapters, battery packs, etc.), speakers (headphones or speaker systems), remote control devices, network devices, or automobile integration units.

Embodiments of the invention are discussed below with reference to FIGS. 1-8. However, those skilled in the art will readily appreciate that the detailed description given herein with respect to these figures is for explanatory purposes as the invention extends beyond these limited embodiments.

Figure 1B:
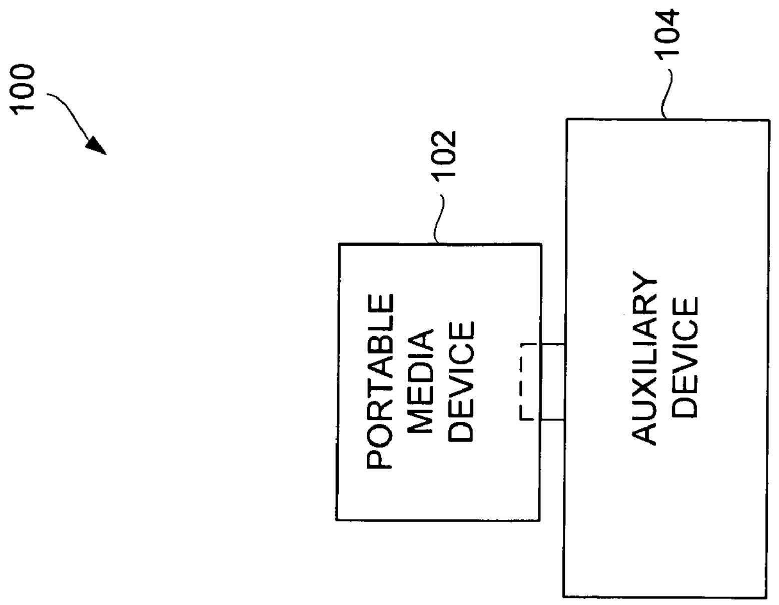
FIGS. 1A and 1B are diagrams of a mobile media environment according to one embodiment of the invention.
Figure 1A:
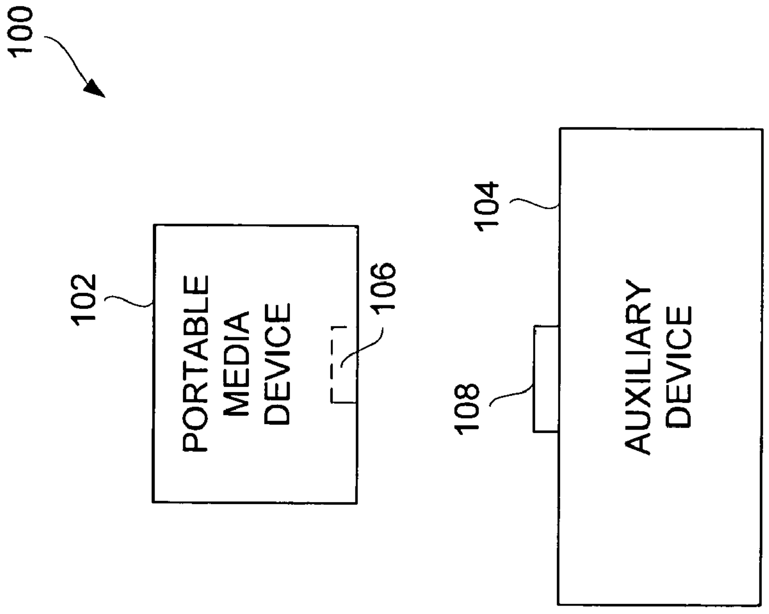

FIGS. 1A and 1B are diagrams of a mobile media environment 100 according to one embodiment of the invention. The mobile media environment 100 includes a portable media device 102. The portable media device 102 is a self-contained computing device that can perform various operations. For example, the portable media device 102 can be a media playback device and be operable to receive user inputs, store media content, output media content, etc. In addition, the portable media device 102 can be connected to an auxiliary device 104. In one embodiment, the auxiliary device 104 can also be referred to as an accessory device for the portable media device 102. The auxiliary device 104 can operate to augment the capabilities of the portable media device 102. For example, in one embodiment, the auxiliary device 104 can provide additional media output capabilities. In the embodiment illustrated in FIGS. 1A and 1B the portable media device 102 can be connected to the auxiliary device 104 using a connector 106 on the portable media device 102 and a counterpart connector 108 on the auxiliary device 104. FIG. 1B illustrates the portable media device 102 being connected to the auxiliary device 104 via the connectors 106 and 108.

Figure 2:
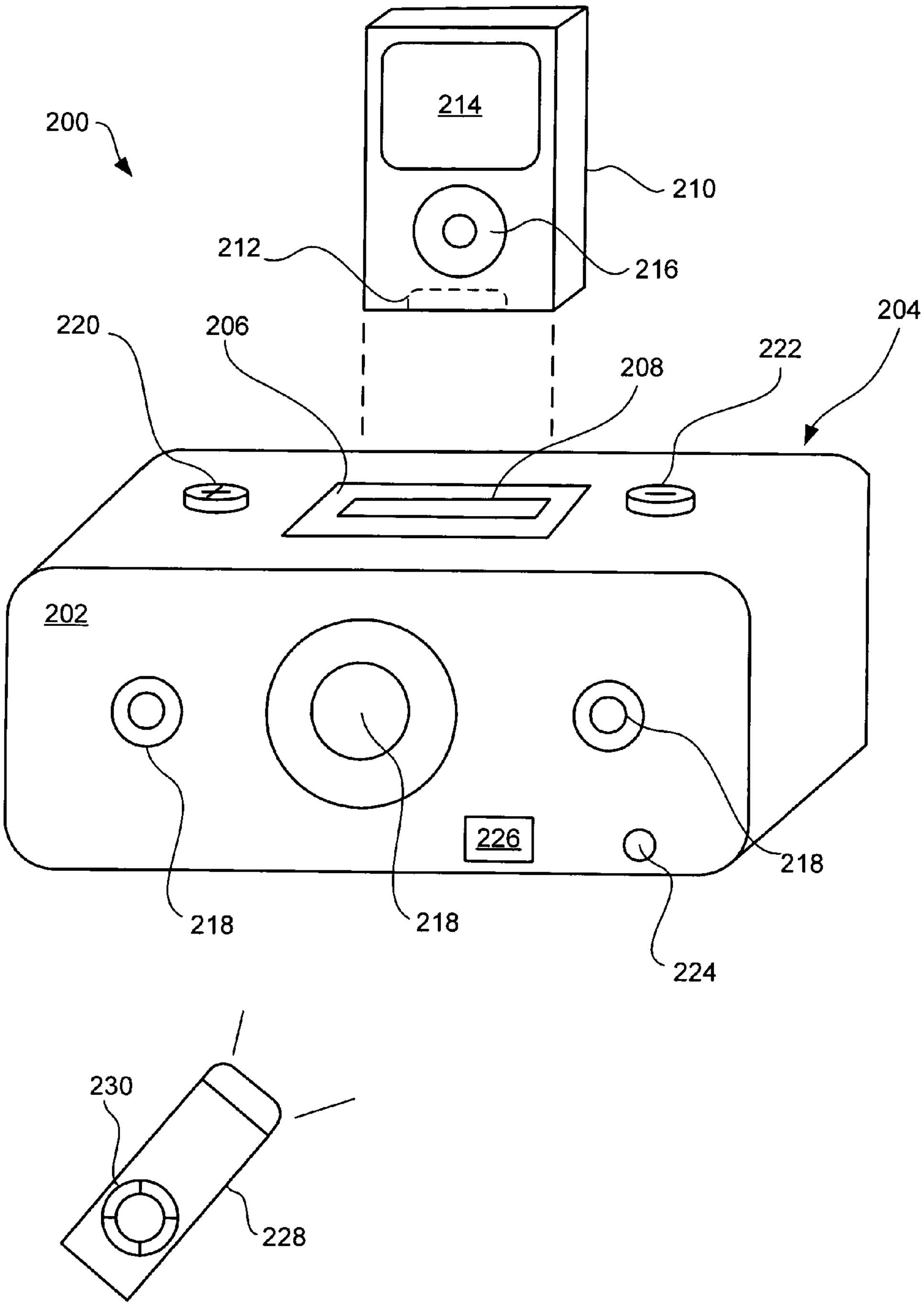
FIG. 2 is a diagram of a media system according to one embodiment of the invention.

FIG. 2 is a diagram of a media system 200 according to one embodiment of the invention. The media system 200 includes a media delivery apparatus 202. The media delivery apparatus 202 serves to output media, such as outputting audio sounds. For example, the audio sound can pertain to music. The media delivery apparatus 202 can also be referred to as a media delivery accessory. More particularly, the media delivery apparatus 202 can be considered a speaker system.

The media delivery apparatus 202 includes a housing 204 that supports or contains various components of the media delivery apparatus 202. The housing 204 includes an opening or receptacle 206 and a connector 208 disposed therein. Besides the media delivery apparatus 202, the media system 200 also includes a portable media player 210. The portable media player 210 is, more generally, a portable computing device, such as the portable media device 102 illustrated in FIG. 1. The portable media player 210 includes a connector 212, a display 214 and a user input device 216. The user input device 216 can, for example, be a touch pad, a dial, a wheel, and/or a button. As shown in FIG. 2, the exemplary user input device 216 depicted is a circular touchpad that supports rotational inputs and may include a center button. Typically, the portable media player 210 is a battery-powered media playback device. The battery-powered media playback devices can be highly portable, such as handheld or pocket-sized media players. Examples of portable media device include media players (e.g., MP3 players or video players), cell phones having media support, and PDAs.

Although the portable media player 210 is fully operational apart from the media delivery apparatus 202, the portable media player 210 can be connected to the media delivery apparatus 204. In particular, the portable media player 210 includes the connector 212. The portable media player 210 can be placed in the opening or receptacle 206 such that the connector 208 physically and electrically connects with the connector 212 of the portable media player 210, thereby connecting the portable media player 210 to the media delivery apparatus 204. The opening or receptacle 206 can also be considered a media bay opening for removably receiving the portable media player 210. Once connected, the portable media player 210 can interact with the media delivery apparatus 204 to acquire status information. Then, using the status information acquired from the media delivery apparatus 204, the portable media player 210 can be configured to operate in accordance with status of the media delivery apparatus 204. For example, a graphical user interface (GUI) provided by the portable media player 210 can be configured to incorporate one or more user interface components that pertain to or reflect the media delivery apparatus and its status.

The media delivery apparatus 202 includes a plurality of speakers 218. In one embodiment, the speakers 218 include a pair of midrange speakers and a subwoofer speaker. The housing 204 also includes volume control devices 220 and 222. In one embodiment, the volume control devices 220 and 222 are buttons. Still further, the housing 204 can include an indicator light 224 that is operated to provide visual feedback to the user regarding the operation or condition of the media delivery apparatus 202. The housing 204 can also include an infrared receiver window 226 that can be used by an infrared receiver internal to the housing 204 when picking up wireless infrared transmissions from a remote controller 228. In the embodiment shown in FIG. 2, the remote controller 228 includes a plurality of user input controls 230. Through use of the user input controls 230 on the remote controller 228, the user is able to indirectly interact with the portable media player 210 or directly interact with the media delivery apparatus 202. For example, the user of the remote controller 228 can interact with the user input controls 230 to select a media item to be played on the portable media player 210 with its audio output being provided by the speakers 218 of the media delivery apparatus 202. The remote controller 228 can also be used to alter the volume of the audio output from the media delivery apparatus 202.

Figure 3A:
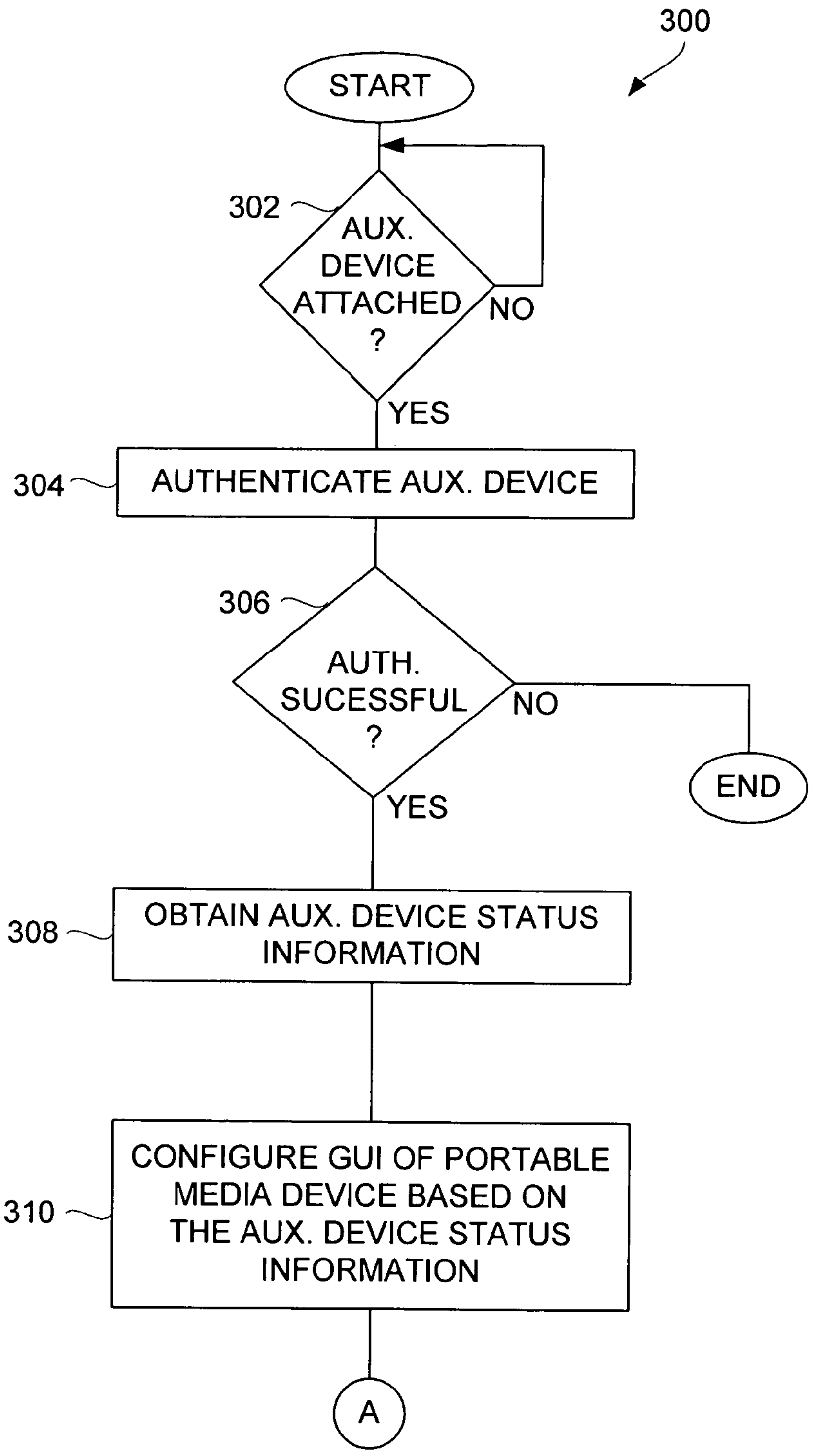
FIGS. 3A and 3B are flow diagrams of a dynamic graphical user interface (GUI) process according to one embodiment of the invention.
Figure 3B:
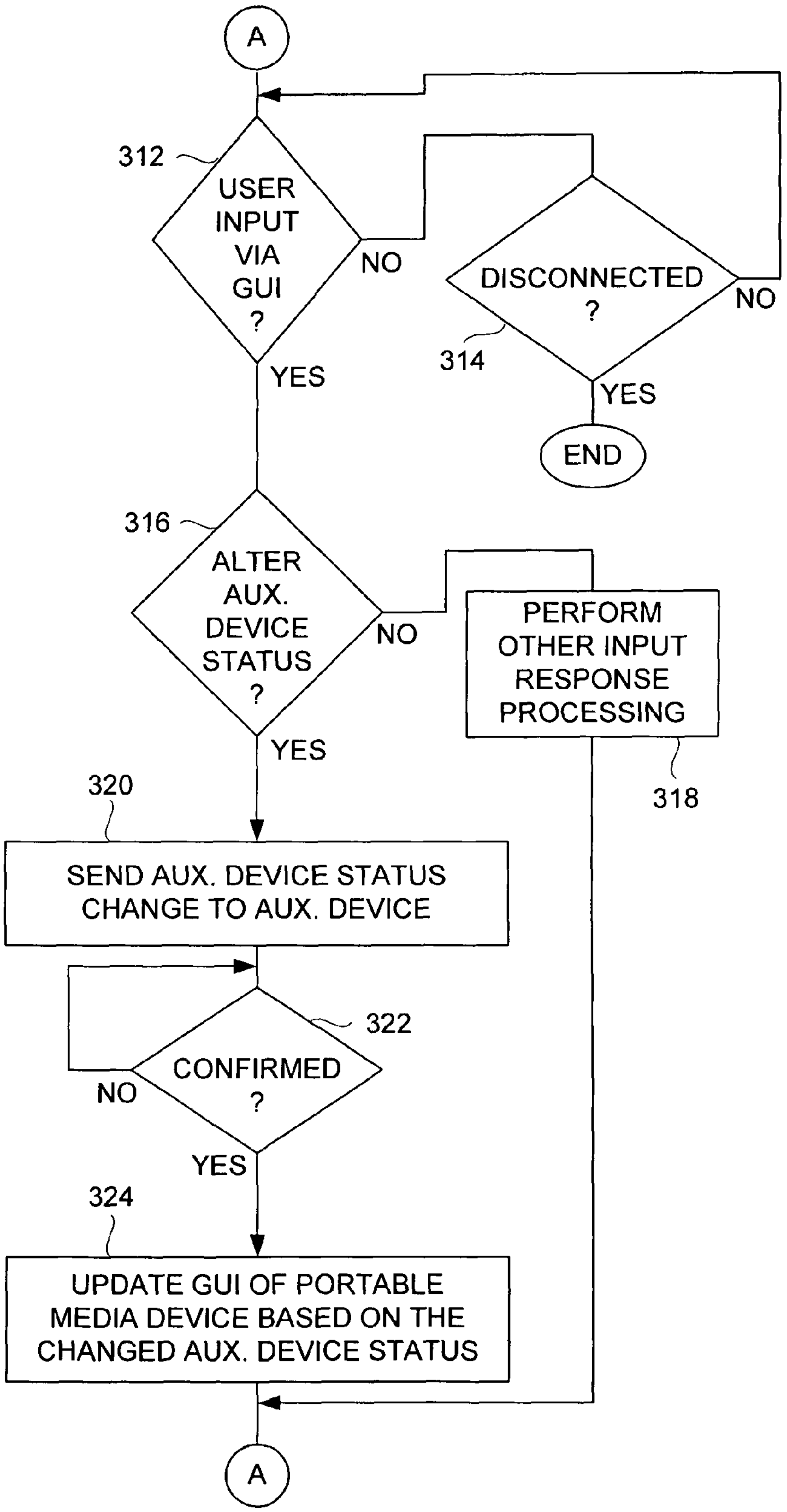

FIGS. 3A and 3B are flow diagrams of a dynamic graphical user interface (GUI) process 300 according to one embodiment of the invention. The dynamic GUI process is, for example, performed by a mobile computing device, such as the portable media device 102 illustrated in FIGS. 1A and 1B or a media player, such as the portable media player 210 illustrated in FIG. 2.

The dynamic GUI process 300 begins with a decision 302 that determines whether an auxiliary device has been attached. When the decision 302 determines that an auxiliary device has not been attached, the dynamic GUI process 300 awaits such an attachment. In other words, the dynamic GUI process 300 can be deemed invoked when an auxiliary device is attached.

Once the decision 302 determines that an auxiliary device has been attached, the auxiliary device is authenticated 304. A decision 306 then determines whether the authentication of the auxiliary device has been successful. When the decision 306 determines that the authentication was unsuccessful, then the dynamic GUI process 300 ends because the auxiliary device is not authenticated and therefore not permitted to be utilized.

On the other hand, when the decision 306 determines that authentication has been successful, auxiliary device status information is obtained 308 from the auxiliary device. The auxiliary device status information is generally information obtained from the auxiliary device that defines or describes its status regarding one or more conditions. As an example, the auxiliary device status information could include information on one or more of: a volume setting, an equalization setting, a list of alternate equalization settings, a device identifier, a device name, a device model number, and a device version number. After the auxiliary device status information has been obtained 308, the GUI of the portable media device is configured 310 based on the auxiliary device status information.

Next, a decision 312 determines whether a user input has been received via the GUI. When the decision 312 determines that a user input has not been received, a decision 314 determines whether the auxiliary device has been disconnected from the portable media device. When the decision 314 determines that the auxiliary device has not been disconnected, then the dynamic GUI process 300 returns to repeat the decision 312 and subsequent blocks. Once the decision 312 determines that a user input has been received from the GUI, a decision 316 determines whether the auxiliary device status has been altered. When the decision 316 determines that the auxiliary device has not been altered by the user input, other input response processing can be performed 318 based on the nature of the user input. For example, the other input response processing could start, stop or advance playback of a media item via the portable media device.

Alternatively, when the decision 316 determines that the auxiliary device status has been altered by the user input, then the auxiliary device status change is sent 320 to the auxiliary device. This can enable the auxiliary device to update its status in accordance with the change to the auxiliary device status. A decision 322 then determines whether the change to the auxiliary device status has been confirmed by the auxiliary device.

Once the decision 322 determines that the change to the auxiliary device status has been confirmed, the graphical user interface of the portable media device can be updated 324 based on the changed auxiliary device status. For example, if the change to the auxiliary device status was a change to an equalization setting for the auxiliary device, then the update 324 of the GUI for the portable media device could alter the GUI so as to reflect the change to the equalization setting. As another example, if the change to the auxiliary device status was a change to a volume setting for the auxiliary device, then the update 324 of the GUI for the portable media device could alter the GUI so as to reflect the change to the volume setting.

Following the block 324 as well as following the block 318, the dynamic GUI process 300 returns to repeat the decision 312 and subsequent blocks so that subsequent user inputs via the GUI can be similarly processed until the auxiliary device is disconnected from the portable media device. As noted above, the decision 314 determines that the auxiliary device has been disconnected. When the decision 314 does determine that the auxiliary device has been disconnected, the dynamic GUI process 300 ends. In ending the dynamic GUI process 300, the auxiliary device would be disabled (e.g., no longer authorized) and the GUI would return to its prior state, e.g., such as its state before the configuration 310.

In general, the dynamic GUI process 300 can operate to produce a GUI for a mobile computing device that is dependent on an accessory device coupled thereto. More particularly, any one or more of the presence, type, status, setting, condition, state or mode of the accessory device can influence the GUI for the mobile computing device. As discussed above, the presence or type of accessory device can cause the GUI to be configured differently. As also discussed above, the status or condition of the accessory device can also be reflected in the GUI, such as for equalization settings and volume settings. Still further, various other statuses, settings, conditions, states or modes can also be reflected in the GUI. For example, a default device setting can be altered when an accessory device of a certain type is identified. As a particular example, when the mobile computing device is a portable media player with a LCD screen, the presence of an attached speaker system (accessory device) can cause the default backlight state for the LCD screen to be always on (as opposed to being on only when user activity is present). As another particular example, when the mobile computing device is a portable media player with a display screen, the presence of an attached speaker system (accessory device) can cause the default playback display screen to display media artwork (e.g., album art) while the media item is being played (as opposed to displaying playback status information).

Figure 4:
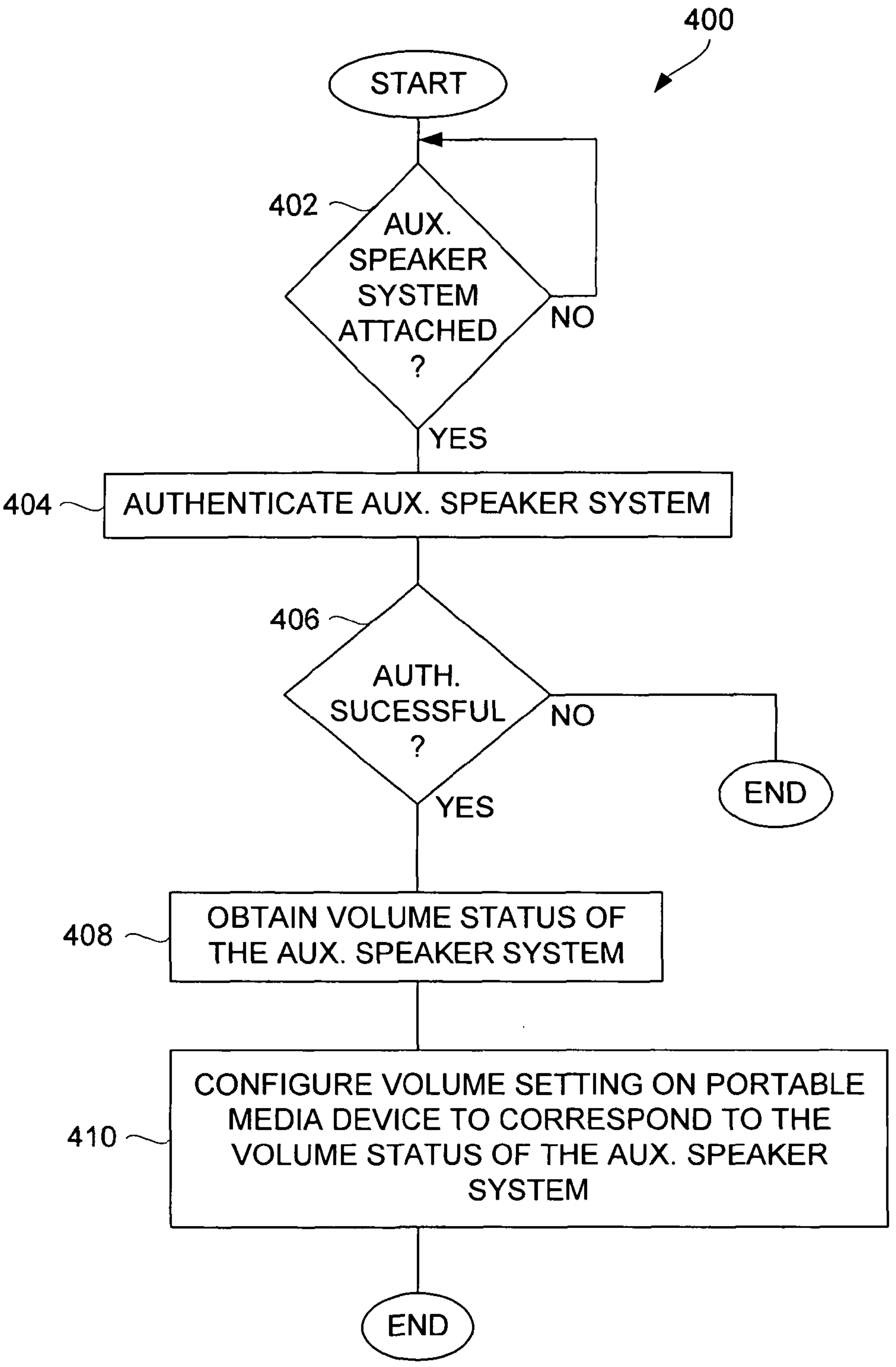
FIG. 4 is a flow diagram of an initial volume control process according to one embodiment of the invention.

FIG. 4 is a flow diagram of an initial volume control process 400 according to one embodiment of the invention. The initial volume control process 400 is, for example, performed by the portable media device, such as the portable media device 102 illustrated in FIGS. 1A and 1B or the portable media player 210 illustrated in FIG. 2.

The initial volume control process 400 begins with a decision 402. The decision 402 determines whether an external speaker system is attached. When the decision 402 determines that an external speaker system is not attached, then the initial volume control process 400 awaits such an attachment. In other words, the initial volume control process 400 can be deemed invoked once an external speaker system, i.e., one type of accessory device, is attached to the portable media device. As an example, the portable media device can obtain a device identifier from the accessory device, and then use the device identifier to determine whether the accessory device is an external speaker system.

Once the decision 402 determines that an external speaker has been attached to the portable media device, the auxiliary speaker system is authenticated 404. The decision 406 then determines whether the authentication of the auxiliary speaker system has been successful. When the decision 406 determines that the authentication of the auxiliary speaker system has not been successful, the initial volume control process 400 ends such that the auxiliary speaker system is not permitted to be utilized with the portable media device.

On the other hand, when the decision 406 determines that the authentication of the auxiliary speaker system has been successful, a volume status of the auxiliary speaker system is obtained 408. Next, a volume setting on the portable media device is set 410 to correspond to the volume status of the auxiliary speaker system. In one embodiment, the setting 410 of the volume settings on the portable media device operates to update the GUI associated with the portable media device to reflect the volume settings. As one example, the GUI might include a volume bar or slider, and the volume bar or slider could be updated to reflect a volume setting that corresponds to the volume status of the auxiliary speaker system. As another example, the GUI might include a numerical volume setting (e.g., 0-10) that could be updated to reflect a volume setting that corresponds to the volume status of the auxiliary speaker system. Following the block 410, the initial volume control process 400 is complete and ends.

In one embodiment, after the external speaker system is detached from the portable media device, the portable media device can revert to its volume condition prior to being set 410 to correspond to the volume status of the auxiliary speaker system. The auxiliary speaker system can retain its last volume status after being detached from a portable media device so that when later re-attached a portable media device the volume status can be supplied to the portable media device.

Figure 5A:
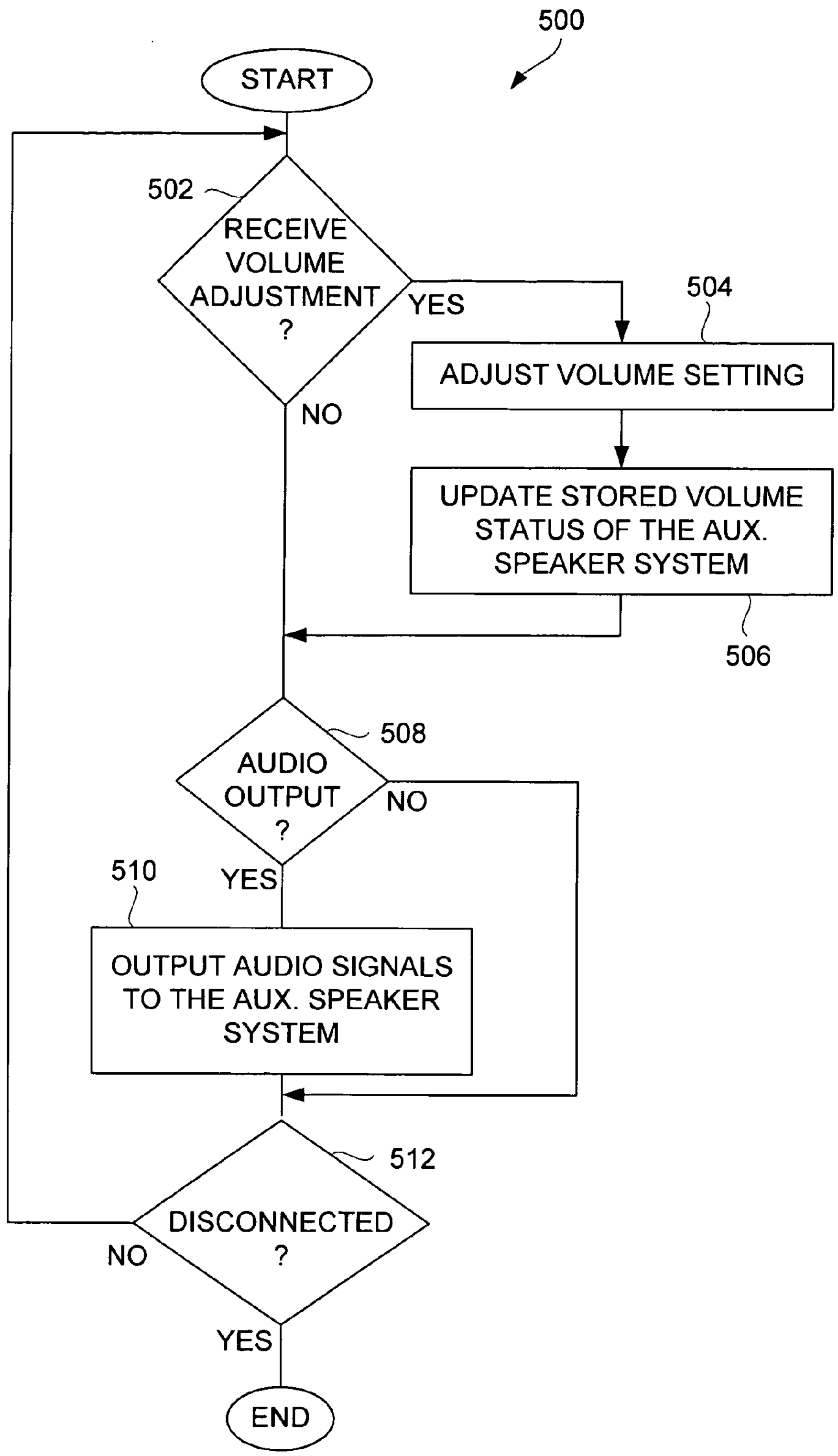
FIG. 5A is a flow diagram of an audio playback process according to one embodiment of the invention.

FIG. 5A is a flow diagram of an audio playback process 500 according to one embodiment of the invention. The audio playback process 500 is, for example, performed by a portable media device, such as the portable media device 102 illustrated in FIGS. 1A and 1B or the portable media player 210 illustrated in FIG. 2.

The audio playback process 500 begins with a decision 502 that determines whether a volume adjustment has been received. Here, the volume adjustment can be provided by a user control with respect to the portable media device, by a user input control with respect to the auxiliary device, or by a user input with respect to a remote controller. For example, a user control of the portable media player can be the user input device 216 of the portable media player 210 illustrated in FIG. 2. As another example, a user input control for the auxiliary device can be the volume control devices 220 and 222 of media delivery apparatus 202 illustrated in FIG. 2. As still another example, a user input with respect to a remote controller can be the user input controls 230 of the remote controller 228.

When the decision 502 determines that a volume adjustment has been received, a volume setting is adjusted 504 in view of the volume adjustment being received. The volume setting adjustment 504 can be performed on either the auxiliary device or the portable media device. When the volume setting adjustment 504 is performed on the portable media device, the stored volume status of the auxiliary speaker system is updated 506. Typically, this requires that the portable media device inform the auxiliary device of the adjustment to the volume setting. In so informing the auxiliary device, the portable media device could provide an adjustment relative to a current setting (e.g., increase by two levels), or could provide a new volume setting (e.g., volume level 8). More generally, when the volume setting is adjusted 504 on the portable media device, the adjustment can be reflected in a user interface component of a graphical user interface that is presented on a display associated with the portable media device. This can involve the altering, enabling or disabling of the user interface component that represents the volume setting prior to the adjustment.

Following the block 504, the auxiliary speaker system can then update 506 the stored volume status. Following the block 506 as well as directly following the decision 502 when a volume adjustment has not been received, a decision 508 determines whether an audio output is to be presented. When the decision 508 determines that an audio output is to be presented, audio signals are output 510 to the auxiliary speaker system. Here, the auxiliary speaker system understands the appropriate volume setting to be utilized when processing and producing audio sound in accordance with the audio signals. For example, the auxiliary speaker system can include its own amplifier system that can be controlled in accordance with the stored volume status of the auxiliary speaker system.

Next, following the block 510 or following the decision 508 directly when an audio output is not being provided, a decision 512 determines whether the auxiliary speaker system has been disconnected from the portable media device. When the decision 512 determines that the auxiliary speaker system has been disconnected from the portable media device, the audio playback process ends. Alternatively, when the decision 512 determines that the auxiliary speaker system has not been disconnected from the portable media device, the audio playback process returns to repeat the decision 502 and subsequent blocks so that audio playback can start or continue and volume adjustments can be made with respect to the output volume from any of a number of different user input controls.

Figure 6A:
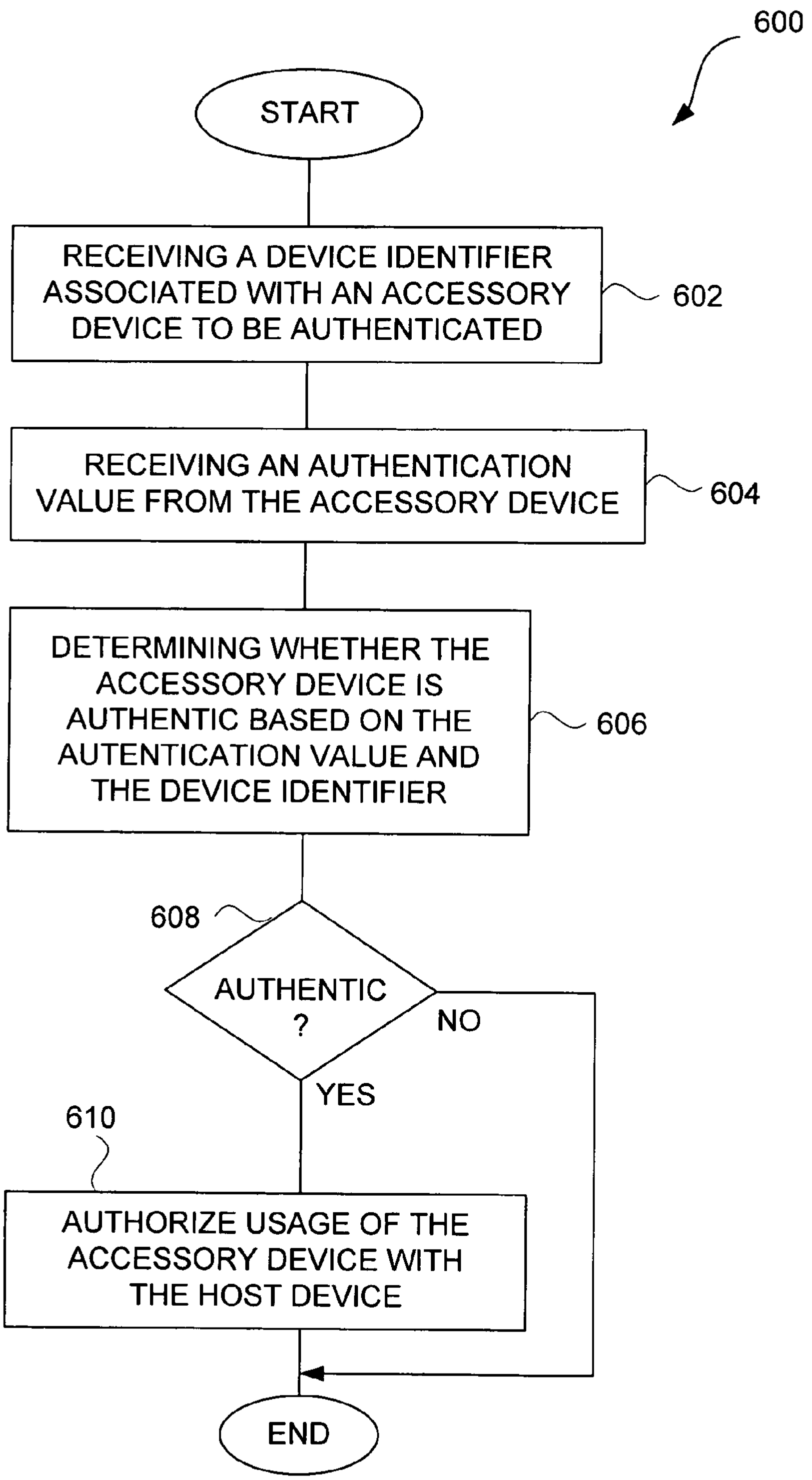
FIG. 6A is a flow diagram of a host authentication process according to one embodiment of the invention.
Figure 6B:
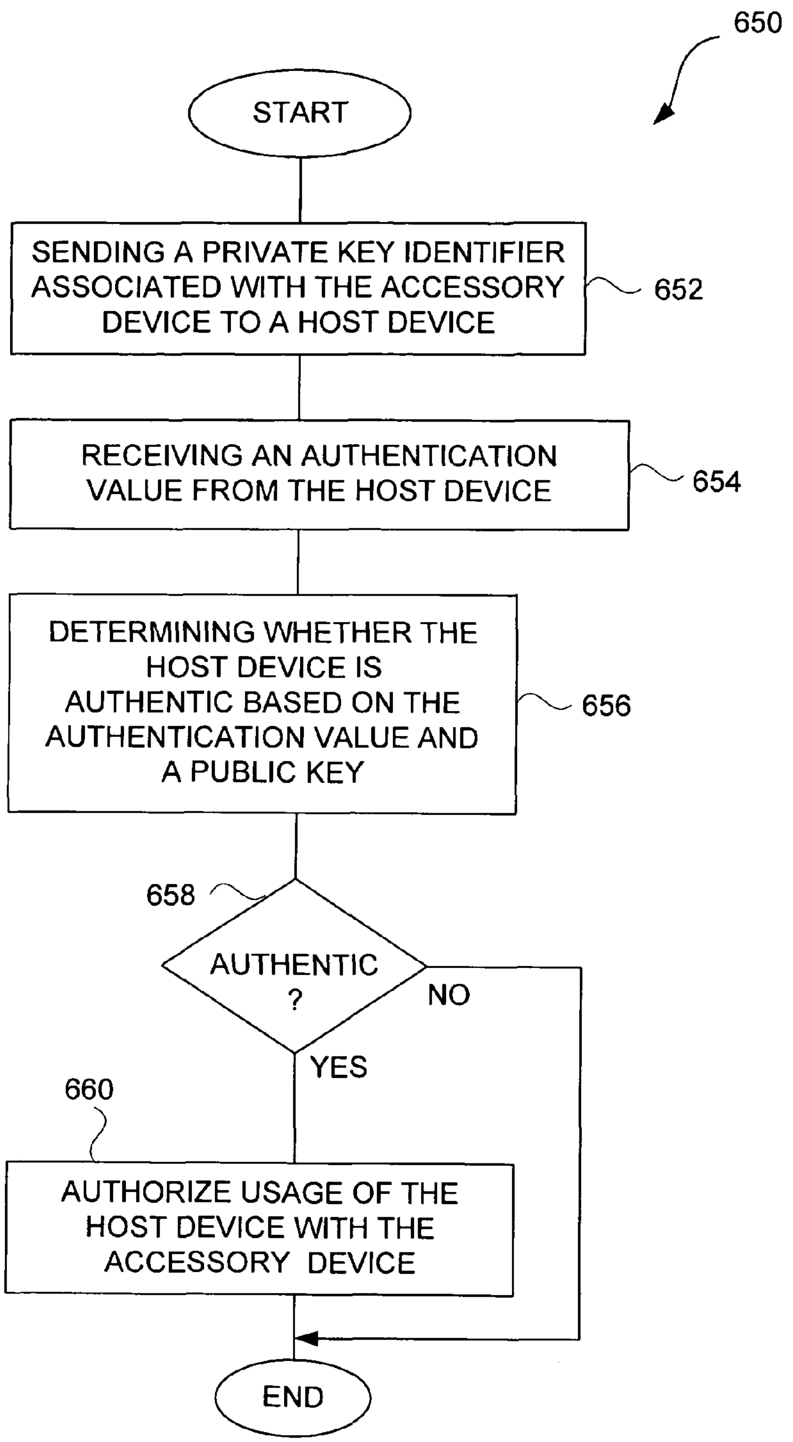
FIG. 6B is a flow diagram of an accessory authentication process according to one embodiment of the invention.

The authentication processing associated with block 304 of FIG. 3A and block 404 of FIG. 4 can be performed using a variety of different techniques. FIGS. 6A and 6B illustrate complementary authentication processing for a host device (e.g., media device) and an accessory device. Regardless of the particular techniques utilized, the authentication techniques utilized can allow a host device to authenticate an accessory device, or can allow an accessory device to authenticate a host device.

Figure 5B:
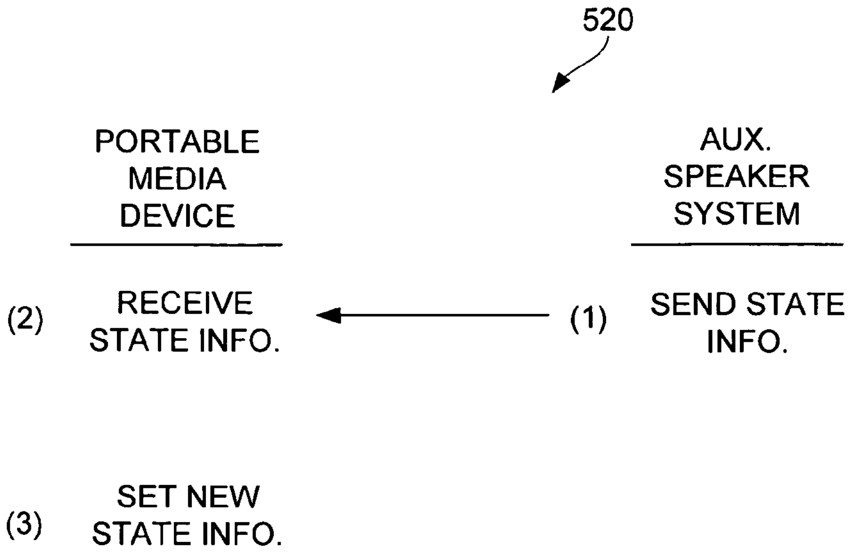
Figure 5C:
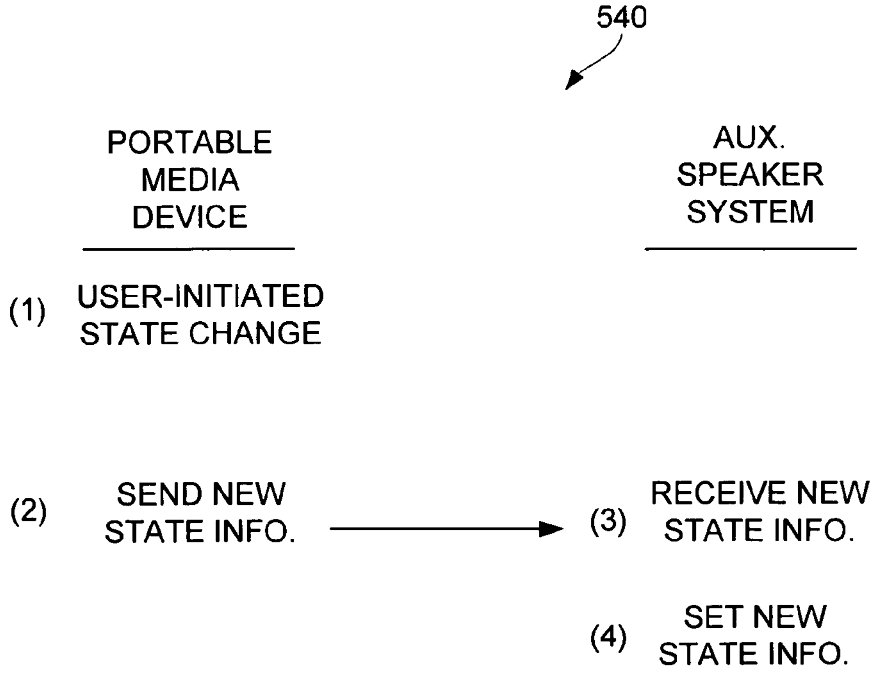
Figure 5D:
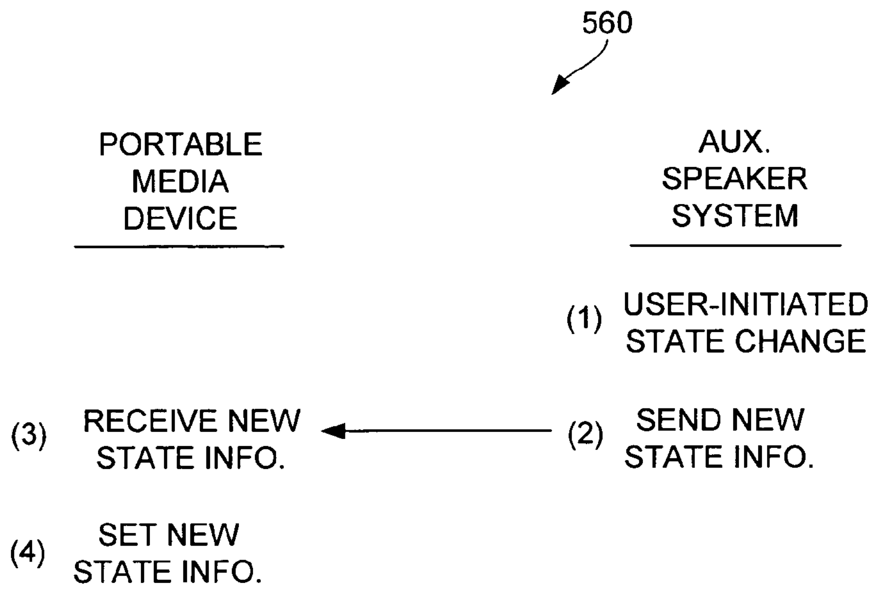

The interaction between media devices and accessory devices can be implemented in a variety of different ways. Once a media device and an accessory device are connected (either directly via a connector or indirectly via a cable or wirelessly), information can be exchanged and utilized for enhanced operation of either device. The interaction can be limited to those devices that are able to be authenticated. FIGS. 5B-5D are diagrams illustrating some embodiments of available implementations that can be used when media devices and accessory devices interact to exchange information. In the different embodiments shown in FIGS. 5B-5D, the media device is a portable media player and the accessory device is an auxiliary speaker system; however, it should be understood that the interaction provided by these embodiments is equally suitable for use with other media devices and accessory devices.

FIG. 5B is an information exchange 520 between a portable media device and an auxiliary speaker system according to one embodiment of the invention. In this embodiment, the auxiliary speaker system initially sends state information to the portable media device. The portable media device can then operate to set new state information at the portable media device. Thereafter, the portable media device can operate in accordance with the new state information. For example, the new state information can record the status of state (condition) of the auxiliary speaker system and be used at the portable media player to cause a state (condition) at the portable media device to be changed. As one example, the new state information can cause the graphical user interface of the portable media device to be altered. An another example, the operation of the portable media device can be altered depending on the new state information. This exchange of state information can be utilized to signal volume conditions, equalization settings, etc. from the auxiliary speaker system to the portable media player.

FIG. 5C is a diagram of information exchange 540 between a portable media device and an auxiliary speaker system according to another embodiment of the invention. In this embodiment, a user typically initiates a state change at the portable media device. The user can initiate a state change in a variety of different ways, including utilizing an input device associated with the portable media device or a remote controller suitable for use with the portable media device. After the user has initiated a state change, new state information that results therefrom can be sent to the auxiliary speaker system. Upon receiving the new state information, the auxiliary speaker system can set state information accordingly. For example, the user-initiated state change can signal a volume change to the auxiliary speaker system. In such case, the change in volume can be sent to the auxiliary speaker system and then used to set the output volume for the auxiliary speaker system.

FIG. 5D is a diagram of information exchange 560 between a portable media device and an auxiliary speaker system according to still another embodiment of the invention. In this embodiment, a user-initiated state change can be originated at an auxiliary speaker system. The user-initiated state change, for example, is caused by a user interacting with an input device associated with the auxiliary speaker system. After the user-initiated state change has been received, new state information associated with the user-initiated state change is sent to the portable media device. Upon receiving the new state information, new state information can be set at the portable media device. In this regard, the portable media device can either simply record the state information associated with the auxiliary speaker system for later use or can cause an operation change at the portable media device, such as causing a user interface at the portable media device to be updated to reflect the new state information, altering output signals from the portable media device, etc.

Figure 5E:
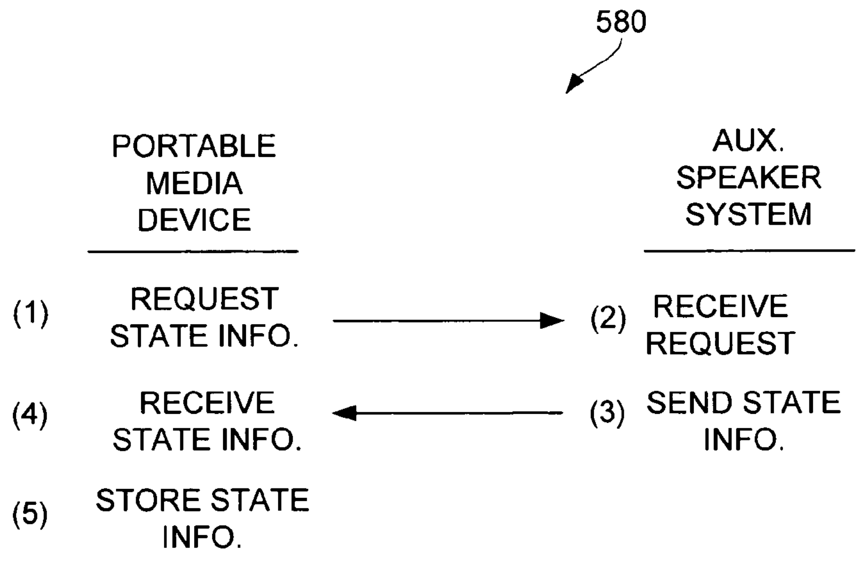

FIG. 5E is a diagram of an information exchange 580 between a portable media device and an auxiliary speaker system according to yet another embodiment of the invention. In this embodiment, the portable media device requests state information from an auxiliary speaker system. The request for state information is sent to the auxiliary speaker system. When the auxiliary speaker system receives the request for state information, the auxiliary speaker system can acquire its state information. The type of state information can vary, and the state information being requested can be a particular type of state information. Examples of state information depend on the types of devices but for media devices can include volume level, equalization setting, etc. After the auxiliary speaker system has acquired its state information, the state information is sent back to the portable media device. Upon receiving the state information from the auxiliary speaker system, the portable media device can store the state information. Once stored, the portable media device can utilize the stored state information to alter its behavior. For example, the portable media device can utilize the stored state information to display on a user interface the state of the auxiliary speaker system. The portable media device could also alter its operations or processing dependent upon the stored state information. For example, the portable media device might output audio signals differently to the auxiliary speaker system depending upon the state information associated with the auxiliary speaker system.

As a specific example, the information exchange, such as the information exchange 580, can be used to request an equalization setting from the auxiliary speaker system. The portable media player can then receive the equalization setting and adapt its user interface to denote the current equalization setting of the auxiliary speaker system. The portable media player can also request and receive a list of available equalization settings that are available or supported by the auxiliary speaker system. The user interface can also be adapted to display the list of equalization settings. In one implementation, the current equalization setting can be implemented as an index value into the list of equalization settings, which can pertain to names of the equalization settings.

FIG. 6A is a flow diagram of a host authentication process 600 according to one embodiment of the invention. The host authentication process 600 is, for example, performed by a host device. As an example, the host device can be the portable media device 102 illustrated in FIG. 1 or the portable media player 210 illustrated in FIG. 2.

The host authentication process 600 initially receives 602 a device identifier associated with an accessory device to be authenticated. Additionally, an authentication value is received 604 from the accessory device. Here, the host device is performing the authentication process; hence, the accessory device provides the authentication value to the host device. In one embodiment, in determining the authentication value, the accessory device utilizes a random number and a private key. The random number can be provided to the accessory device by the host device, or the random number can be available from the accessory device.

Next, the host authentication process 600 determines 606 whether the accessory device is authentic based on the authentication value and the device identifier. A decision 608 then determines whether the accessory device is authentic based on the determination made at block 606. When the decision 608 determines that the accessory device has been determined to be authentic, usage of the accessory device with the host device is authorized 610. The nature of the usage being authorized 610 can vary depending upon implementation. For example, the usage authorized 610 could allow complete usage of the accessory device or could allow limited usage of the accessory device.

On the other hand, when the decision 608 determines that the accessory device is not authentic, then the block 610 is bypassed such that the accessory device is not authorized for usage with the host device. In this case, since the accessory device was not determined to be authentic, usage of the accessory device with the host device is substantially restricted or prevented. Following the block 610, or its being bypassed, the host authentication process 600 is complete and ends.

FIG. 6B is a flow diagram of an accessory authentication process 650 according to one embodiment of the invention. The accessory authentication process 650 is, for example, performed by an accessory device. As an example, the accessory device can be the auxiliary device 104 illustrated in FIG. 1 or the media delivery apparatus 202 illustrated in FIG. 2.

The accessory authentication process 650 sends 652 a private key identifier associated with the accessory device to a host device. The private key identifier is used by the host device to obtain an appropriate private key which is used by the host device in producing the authentication value which is sent to the accessory device. The accessory device will receive 654 an authentication value from the host device.

Next, the accessory authentication process 650 determines 656 whether the host device is authentic based on the authentication value and a public key. Typically, the public key would be provided internal to the accessory device. A decision 658 then determines whether the host device has been determined to be authentic. When the decision 658 determines that the host device has been deemed authentic, then usage of the host device with the accessory device is authorized 660. The nature of the usage being authorized 660 can vary depending upon implementation. For example, the usage authorized 660 could allow complete usage of the host device or could allow limited usage of the host device.

On the other hand, when the decision 658 determines that the host device is not authentic, then the block 660 is bypassed, such that usage of the host device with the accessory device is substantially restricted or prevented. Following the block 660, or its being bypassed, the accessory authentication process 650 is complete and ends.

In one embodiment, a media device, or host device, can also connect to a host computer, such as a personal computer. The personal computer can store, utilize and manage media items. The management of the media items can be not only for the host computer but also for the electronic device.

Figure 7:
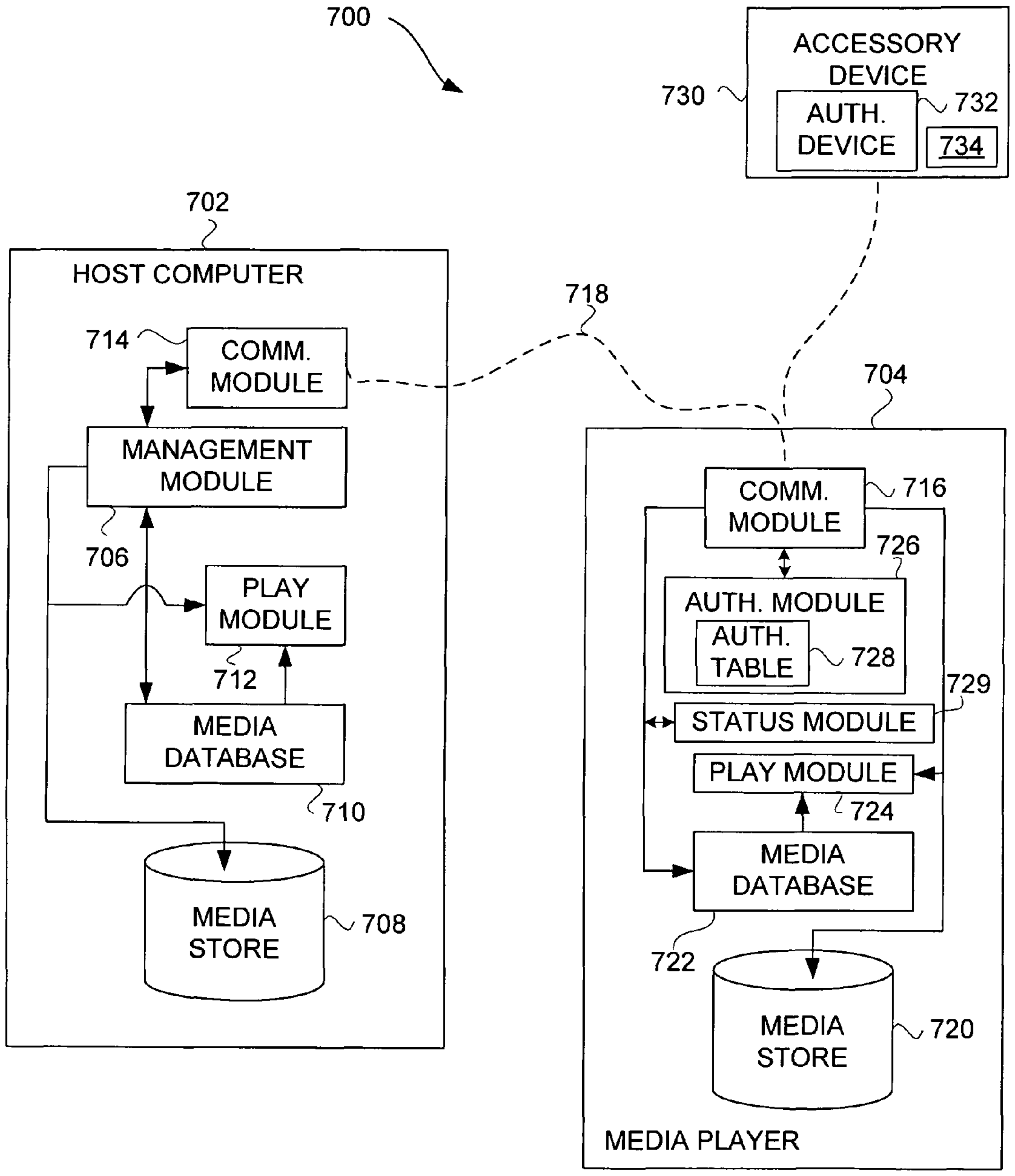
FIG. 7 is a block diagram of a media management system according to one embodiment of the invention.

FIG. 7 is a block diagram of a media management system 700 according to one embodiment of the invention. The media management system 700 includes a host computer 702 and a media player 704. The host computer 702 is typically a personal computer. The host computer, among other conventional components, includes a management module 706 which is a software module. The management module 706 provides for centralized management of media items (and/or playlists) not only on the host computer 702 but also on the media player 704. More particularly, the management module 706 manages those media items stored in a media store 708 associated with the host computer 702. The management module 706 also interacts with a media database 710 to store media information associated with the media items stored in the media store 708.

The media information pertains to characteristics or attributes of the media items. For example, in the case of audio or audiovisual media, the media information can include one or more of: title, album, track, artist, composer and genre. These types of media information are specific to particular media items. In addition, the media information can pertain to quality characteristics of the media items. Examples of quality characteristics of media items can include one or more of: bit rate, sample rate, equalizer setting, volume adjustment, start/stop and total time.

Still further, the host computer 702 includes a play module 712. The play module 712 is a software module that can be utilized to play certain media items stored in the media store 708. The play module 712 can also display (on a display screen) or otherwise utilize media information from the media database 710. Typically, the media information of interest corresponds to the media items to be played by the play module 712.

The host computer 702 also includes a communication module 714 that couples to a corresponding communication module 716 within the media player 704. A connection or link 718 removably couples the communication modules 714 and 716. In one embodiment, the connection or link 718 is a cable that provides a data bus, such as a FIREWIRE™ bus or USB bus, which is well known in the art. In another embodiment, the connection or link 718 is a wireless channel or connection through a wireless network. Hence, depending on implementation, the communication modules 714 and 716 may communicate in a wired or wireless manner.

The media player 704 also includes a media store 720 that stores media items within the media player 704. Optionally, the media store 720 can also store data, i.e., non-media item storage. The media items being stored to the media store 720 are typically received over the connection or link 718 from the host computer 702. More particularly, the management module 706 sends all or certain of those media items residing on the media store 708 over the connection or link 718 to the media store 720 within the media player 704. Additionally, the corresponding media information for the media items that is also delivered to the media player 704 from the host computer 702 can be stored in a media database 722. In this regard, certain media information from the media database 710 within the host computer 702 can be sent to the media database 722 within the media player 704 over the connection or link 718. Still further, playlists identifying certain of the media items can also be sent by the management module 706 over the connection or link 718 to the media store 720 or the media database 722 within the media player 704.

Furthermore, the media player 704 includes a play module 724 that couples to the media store 720 and the media database 722. The play module 724 is a software module that can be utilized to play certain media items stored in the media store 720. The play module 724 can also display (on a display screen) or otherwise utilize media information from the media database 722. Typically, the media information of interest corresponds to the media items to be played by the play module 724.

According to one embodiment, to support an authentication process on the media player 704, the media player 704 can further include an authentication module 726 and an authentication table 728. The authentication module 726 can perform the authentication processing discussed above, such as the host authentication process 600 illustrated in FIG. 6A. The media player 704 can further include a status module 729.

As previously noted, an accessory device can couple to a media player. Hence, FIG. 7 also illustrates an accessory device 730 capable of coupling to the media player 704. According to one embodiment, the accessory device 730 can further include an authentication device 732. The authentication device 732 operates to support the authentication process on the media player 704 according to one embodiment. In one embodiment, the authentication device 732 can perform the authentication processing discussed above, such as the accessory authentication process 650 illustrated in FIG. 6B. The accessory device 730 can also include status information storage 734 to store status information pertaining to the accessory device 730. The status information can be stored to the status information storage 734 by the accessory device 732 or by the media player 704 through the connection or link 718. Further, the status module 729 can configure or modify operation of the media player 704 based on the presence or status of the accessory device 730, such as through operations discussed above in FIG. 3A, 3B, 4 or 5.

Figure 8:
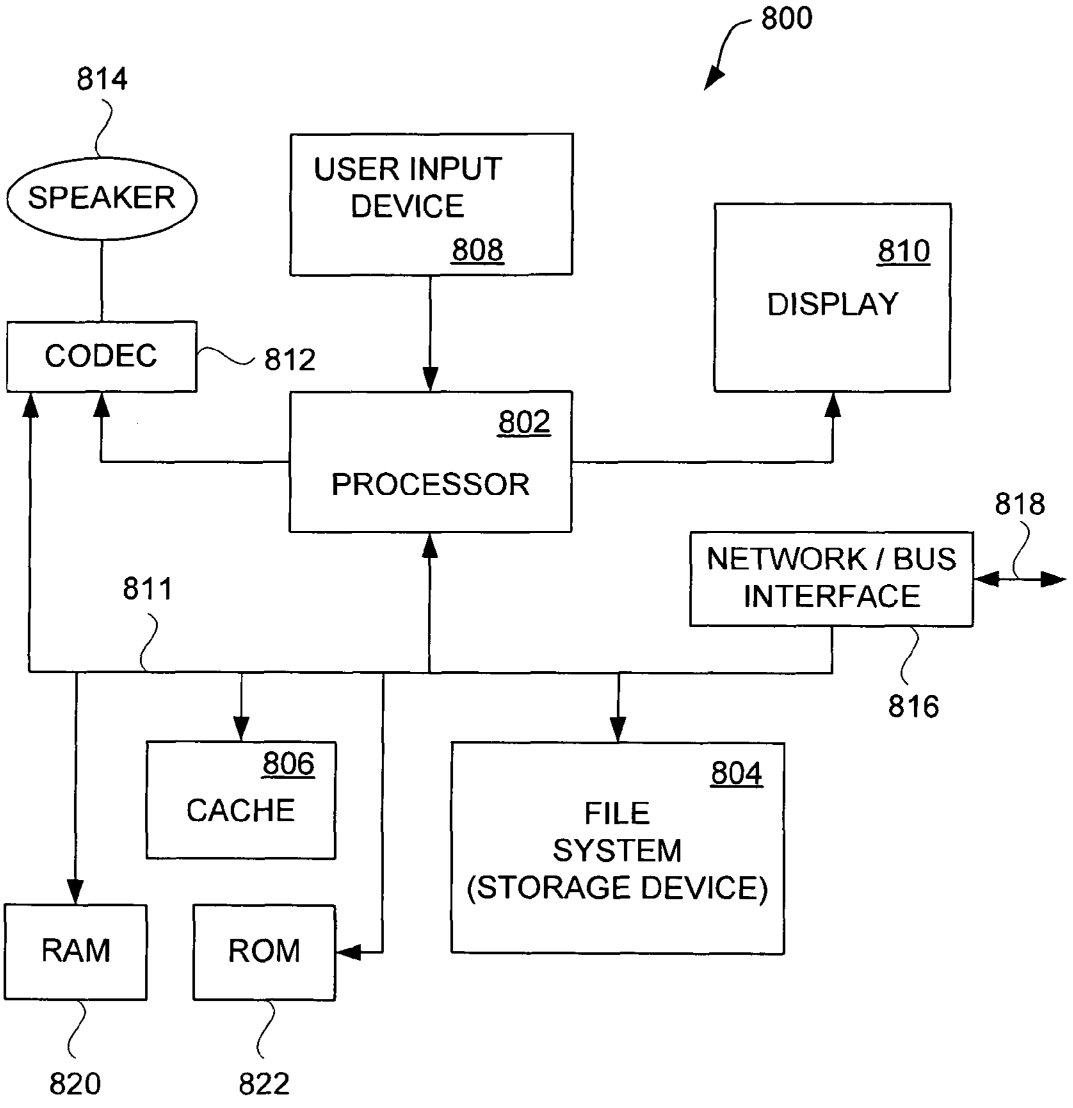
FIG. 8 is a block diagram of a media player according to one embodiment of the invention.

FIG. 8 is a block diagram of a media player 800 according to one embodiment of the invention. The media player 800 includes a processor 802 that pertains to a microprocessor or controller for controlling the overall operation of the media player 800. The media player 800 stores media data pertaining to media items in a file system 804 and a cache 806. The file system 804 is, typically, a storage device. The file system 804 typically provides high capacity storage capability for the media player 800. For example, the file system 804 can be semiconductor-based memory, such as FLASH memory. The file system 804 can store not only media data but also non-media data (e.g., when operated in a data mode). However, since the access time to the file system 804 is relatively slow, the media player 800 can also include a cache 806. The cache 806 is, for example, Random-Access Memory (RAM) provided by semiconductor memory. The relative access time to the cache 806 is substantially shorter than for the file system 804. However, the cache 806 does not have the large storage capacity of the file system 804. Further, the file system 804, when active, consumes more power than does the cache 806. The power consumption is often a concern when the media player 800 is a portable media player that is powered by a battery (not shown). The media player 800 also includes a RAM 820 and a Read-Only Memory (ROM) 822. The ROM 822 can store programs, utilities or processes to be executed in a non-volatile manner. The RAM 820 provides volatile data storage, such as for the cache 806. In one embodiment, the ROM 822 and the RAM 820 can be provided by the storage device providing the file system 804.

The media player 800 also includes a user input device 808 that allows a user of the media player 800 to interact with the media player 800. For example, the user input device 808 can take a variety of forms, such as a button, keypad, dial, etc. Still further, the media player 800 can include a display 810 (screen display) that can be controlled by the processor 802 to display information to the user. The user input device 808 and the display 810 can also be combined in the case of a touch screen. A data bus 811 can facilitate data transfer between at least the file system 804, the cache 806, the processor 802, and the CODEC 812.

In one embodiment, the media player 800 serves to store a plurality of media items (e.g., songs) in the file system 804. When a user desires to have the media player play a particular media item, a list of available media items is displayed on the display 810. Then, using the user input device 808, a user can select one of the available media items. The processor 802, upon receiving a selection of a particular media item, supplies the media data (e.g., audio file) for the particular media item to a coder/decoder (CODEC) 812. The CODEC 812 then produces analog output signals for a speaker 814. The speaker 814 can be a speaker internal to the media player 800 or external to the media player 800. For example, headphones or earphones that connect to the media player 800 would be considered an external speaker.

The media player 800 also includes a network/bus interface 816 that couples to a data link 818. The data link 818 allows the media player 800 to couple to a host computer or to accessory devices. The data link 818 can be provided over a wired connection or a wireless connection. In the case of a wireless connection, the network/bus interface 816 can include a wireless transceiver.

The media items (media assets) can pertain to one or more different types of media content. In one embodiment, the media items are audio tracks. In another embodiment, the media items are images (e.g., photos). However, in other embodiments, the media items can be any combination of audio, graphical or video content.

In one embodiment, a portable media device is a portable computing device dedicated, at least in part, to processing media such as audio, video or images. For example, a portable media device can be a media player (e.g., MP3 player, video player), a game player, a video recorder, a camera, an image viewer and the like. These devices are generally battery operated and highly portable so as to allow a user to listen to music, play games or videos, record video or take pictures wherever the user travels. In one implementation, the media player is a handheld device that is sized for placement into a pocket or hand of the user. By being handheld, the media player is relatively small and easily handled and utilized by its user. By being pocket-sized, the user does not have to directly carry the device and therefore the device can be taken almost anywhere the user travels (e.g., the user is not limited by carrying a large, bulky and often heavy device, as in a portable computer). Furthermore, the device may be operated by the users hands, no reference surface such as a desktop is needed.

The various aspects, embodiments, implementations or features of the invention can be used separately or in any combination.

The invention can be implemented by software, hardware, or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described.

Hence, all suitable modifications and equivalents may be resorted to as falling within the scope of the invention.

What is claimed is:

1. A method comprising:

detecting, by a portable media device, attachment of an auxiliary device to the portable media device;

obtaining, by the portable media device, volume status information from the auxiliary device after said detecting, the volume status information including a volume status of the auxiliary device;

thereafter configuring, by the portable media device, a graphical user interface of the portable media device to display information in accordance with the volume status information;

receiving, by the portable media device, updated volume status information from the auxiliary device, wherein the updated volume status information is based on user input entered via an input interface of the auxiliary device; and updating, by the portable media device, the graphical user interface based on the updated volume status information.

2. A method as recited in claim 1, wherein the portable media device includes a display that presents a user interface, and wherein said configuring operates to enable an additional menu or menu item for the user interface.

3. A method as recited in claim 1, wherein said configuring operates to alter operation of the portable media device.

4. A method as recited in claim 1, wherein the attachment is through connection of a first connector on the portable media device and a counterpart connector on the auxiliary device.

5. A method as recited in claim 1, wherein said method further comprises:

authenticating, prior to said configuring, the auxiliary device as authorized for use with the portable media device, and wherein said configuring is performed only if said authenticating has authorized the auxiliary device for use with the portable media device.

6. A method as recited in claim 1, wherein said method further comprises:

subsequently detecting detachment of the auxiliary device from the portable media device; and reconfiguring the portable media device to no longer operate in accordance with the volume status information once detachment of the auxiliary device has been detected.

7. A method as recited in claim 1, wherein said configuring operates to prevent, enable or alter display of at least one user interface component of the graphical user interface.

8. A method as recited in claim 7, wherein the user interface component is a menu item for the graphical user interface.

9. A method as recited in claim 1, wherein said method further comprises:

receiving, via a user interface of the portable media device, a user input that alters the volume status information;

processing the user input at the portable media device to produce altered volume status information; and causing volume status information stored in the auxiliary device to be updated based on the altered volume status information.

10. A method as recited in claim 1, wherein said configuring operates to alter operation of the portable media device based on a device identifier sent by the auxiliary device.

11. A method as recited in claim 1, wherein said configuring operates to configure the portable media device based on a device identifier and auxiliary device status information sent by the auxiliary device.

12. A method as recited in claim 11, wherein said configuring operates to enable an additional menu or menu item for the graphical user interface based on the device identifier and the auxiliary device status information.

13. A method as recited in claim 1, wherein the volume status information further includes an equalization setting of the auxiliary device.

14. A method comprising:

detecting, by the portable media device, attachment of an auxiliary speaker system to the portable media device;

obtaining, by the portable media device, volume status information from the auxiliary speaker system after said detecting, the volume status information including a volume status of the auxiliary speaker system;

thereafter configuring, by the portable media device, a volume setting on a user interface of the portable media device based on the volume status information;

receiving, by the portable media device, updated volume status information from the auxiliary speaker system, wherein the updated volume status information is based on user input entered via an input interface of the auxiliary speaker system; and modifying, by the portable media device, the volume setting on the user interface of the portable media device in response to receiving the updated volume status information.

15. A method as recited in claim 14, wherein said configuring of the volume setting operates to configure at least one graphical user interface component on the portable media device, and wherein the at least one graphical user interface component is a volume setting control.

16. A method as recited in claim 14, wherein the attachment is through connection of a first connector on the portable media device and a counterpart connector on the auxiliary speaker system.

17. A method as recited in claim 14, wherein said method further comprises:

authenticating, prior to said configuring, the auxiliary speaker system as authorized for use with the portable media device, and wherein said configuring is performed only if said authenticating has authorized the auxiliary speaker system for use with the portable media device.

18. A method as recited in claim 14, wherein said method further comprises:

subsequently detecting detachment of the auxiliary speaker system from the portable media device; and reconfiguring the portable media device to no longer operate in accordance with the volume status information once detachment of the auxiliary speaker system has been detected.

19. A method as recited in claim 14, wherein said configuring comprises setting the volume setting on the portable media device based on the volume status information.

20. A non-transitory computer readable medium including at least computer program code for operating a portable media device, said computer readable medium comprising:

computer program code for detecting attachment of an auxiliary device to the portable media device;

computer program code for obtaining volume status information from the auxiliary device after said computer program code for detecting detects that the auxiliary device is attached to the portable media device, the volume status information including a volume status of the auxiliary device;

computer program code for configuring a graphical user interface of the portable media device to display information in accordance with the volume status information;

computer program code for receiving updated volume status information from the auxiliary device, wherein the updated volume status information is based on user input entered via an input interface of the auxiliary device; and computer program code for updating the graphical user interface based on the updated volume status information.

21. A non-transitory computer readable medium including at least computer program code for operating a portable media device, said computer readable medium comprising:

computer program code for detecting attachment of an auxiliary speaker system to the portable media device;

computer program code for obtaining volume status information from the auxiliary speaker system after said computer program code for detecting detects that the auxiliary speaker system is attached to the portable media device, the volume status information including a volume status of the auxiliary speaker system;

computer program code for configuring a volume setting on a user interface of the portable media device based on the volume status information;

computer program code for receiving updated volume status information from the auxiliary speaker system, wherein the updated volume status information is based on user input entered via an input interface of the auxiliary speaker system; and computer program code for modifying the volume setting on the user interface of the portable media device in response to receiving the updated volume status information.

22. A non-transitory computer readable medium as recited in claim 21, wherein said non-transitory computer readable medium further comprises:

computer program code for detecting detachment of the auxiliary speaker system from the portable media device; and computer program code for reconfiguring the portable media device to no longer operate in accordance with the volume status information once detachment of the auxiliary speaker system has been detected.

* * * * *